April 3, 1956 E. GRETENER 2,740,830

TELEVISION OPTICAL PROJECTION SYSTEM

Filed Sept. 4, 1951

4 Sheets-Sheet 1

INVENTOR:-

Edgar Gretener,

BY Pierce, Scheffler & Parker,

ATTORNEYS.

INVENTOR:-
Edgar Gretener,
BY Pierce, Scheffler + Parker,
ATTORNEYS.

INVENTOR:-
Edgar Gretener,
BY Pierce, Scheffler + Parker,
ATTORNEYS.

April 3, 1956 E. GRETENER 2,740,830

TELEVISION OPTICAL PROJECTION SYSTEM

Filed Sept. 4, 1951 4 Sheets-Sheet 4

INVENTOR:-

Edgar Gretener,

BY Pierce, Scheffler + Parker,

ATTORNEYS.

United States Patent Office 2,740,830

Patented Apr. 3, 1956

2,740,830

TELEVISION OPTICAL PROJECTION SYSTEM

Edgar Gretener, Zurich, Switzerland

Application September 4, 1951, Serial No. 245,024

Claims priority, application Switzerland September 18, 1950

6 Claims. (Cl. 178—5.4)

The present invention is relative to an apparatus for projecting television pictures or the like, especially to an apparatus for the simultaneous projection of the constituent pictures of a coloured or stereoscopic or coloured stereoscopic television picture.

In the U. S. Patent of Friedrich E. Fischer, No. 2,391,450 a method is described which is capable of reproducing television pictures with high brilliancy by controlling the light flux of a separate light source, for example, an arc lamp by means of a control medium acted upon by the television signal. The control medium may consist of a layer of viscous liquid or an elastic substance of high internal friction. An electron beam in the habitual way scans in adjacent parallel lines a rectangular area on the surface of the control layer which corresponds to the television picture to be projected. The electron beam itself is modulated by the incoming electric television signals according to the picture content, which results in a corresponding distribution of electric charges on the surface. The electrostatic forces corresponding to the distribution of these charges varying from point-to-point then cause a deformation of the surface. The control layer whose deformation serves to store the incoming television signals is located inside a Schlieren optics and controls the light from an outside source passing through the Schlieren optics. The light leaving the Schlieren optics which in its distribution corresponds to the television picture is projected by a lens on the screen.

It will be understood that it is by no means necessary to bring about the light control by a superficial deformation by electrostatic forces produced by an electron beam. Control media with other variable properties, such as e. g. control media with variable index of refraction, or other methods for effecting point-to-point variations of the control medium, such as e. g. any suitably modulated kind of electromagnetic (infrared, ultraviolet etc.) radiation, may be employed. The essential point common to all such light control methods resides in the feature that point-to-point variations of the optically effective path length of the control layer are produced by means of radiation modulated in accordance with the contents of the picture to be projected, and that the light flux of the separate light source is controlled by such point-to-point variations through the intermediary of a Schlieren optics.

A method for large screen projection of television according to the above mentioned Letters Patent was described in the Journal of the Society of Motion Picture and Television Engineers, vol. 54, April 1950, pp. 393–406, by Labin under the name of Eidophor Method. The system has the advantage that every point of the screen is illuminated for the full length of a picture period in contradistinction to the usual methods of television projection using a cathode-ray tube with a moving light spot. In the latter case only a single point of the entire picture is emitting light at any one instant and the obtainable brightness of the screen is limited by the brightness of the cathode-ray spot, which as is known cannot be increased beyond a certain limit. The Eidophor method in contradistinction thereto uses an independent light source whose light is controlled by the television signal through the control layer inside Schlieren optics and a projection light flux may be attained of the order of magnitude of that of a standard film projector.

The known apparatus for employing the Eidophor method, however, so far has the drawback that only half of the light from the separate light source may be utilized for illumination of the screen. This drawback is due to the previously employed Schlieren optics which consist, in principle, of two bar systems inserted consecutively into the path of the rays. The deformable control layer lies between the two bar systems, which are so mounted relative to each other that the light passing through the bars of the first system passes through the slits of the second system if the control layer is deformed (bright field) or is prevented by the bars of the second system from reaching the screen if the layer is not deformed (dark field). As the light impinging upon the bars of the first system is rejected and does not reach the control layer and as the width of the bars and the intermediate slits of the first system is approximately equal in principle only half of the light emitted by the lamp is available for light control, so that even in the most favourable case (bright field) only 50% of the light flux emitted by the lamp will reach the screen.

It is an object of the invention to utilise the entire light flux delivered to the entrance of the Schlieren optics of a projection system of the above identified type.

It is a further object of the invention to utilise a projection system of the above identified type with one bar system and one concave mirror only for the simultaneous projection of several constituent pictures making up a component television picture or the like.

More specifically it is an object of the invention to utilise a projection system of the above identified type for the projection of stereoscopic or coloured or stereoscopic colour television.

According to the present invention therefore, an apparatus for the simultaneous projection of several constituent pictures of a television picture or the like is employed comprising a light source with an illumination system, a Schlieren optics with a bar system, a concave mirror with a control layer spread over it, a projection lens and at least one source of radiation, scanning said control layer at several areas corresponding to said component pictures and thus imparting point-to-point variations to said layer in correspondence with the appertaining picture signals, said control layer thereby selectively controlling the light flux emitted by said light source.

Such an apparatus is characterized by the feature that the bar system of the Schlieren optics provides reflecting surfaces on both sides of its bars, and that additional deflecting means are located in the light path between the bar system and the concave mirror to deflect the different light beams between said bar system and said concave mirror in such a way that the light coming from said source of light and striking the bars as well as the light passing between the bars is utilized for the illumination of the picture areas and that from each of said areas a virtual image of the bar system is seen with its center approximately at the center of curvature of the concave mirror, and that from the projection lens said picture areas are seen to coincide in registration.

The embodiments of the present invention will now be explained in detail with the help of the drawings, where further features and qualities of the invention will emerge from the following description. Reference will be made to the above mentioned "Eidophor" system, which employs a control layer the surface of which is deformed by a cathode ray. The invention is, however, not intended to be limited thereby to that particular system, as it may advantageously be employed also in other systems providing a control medium with other variable properties or other methods to bring about these variations.

Figures 3, 4:
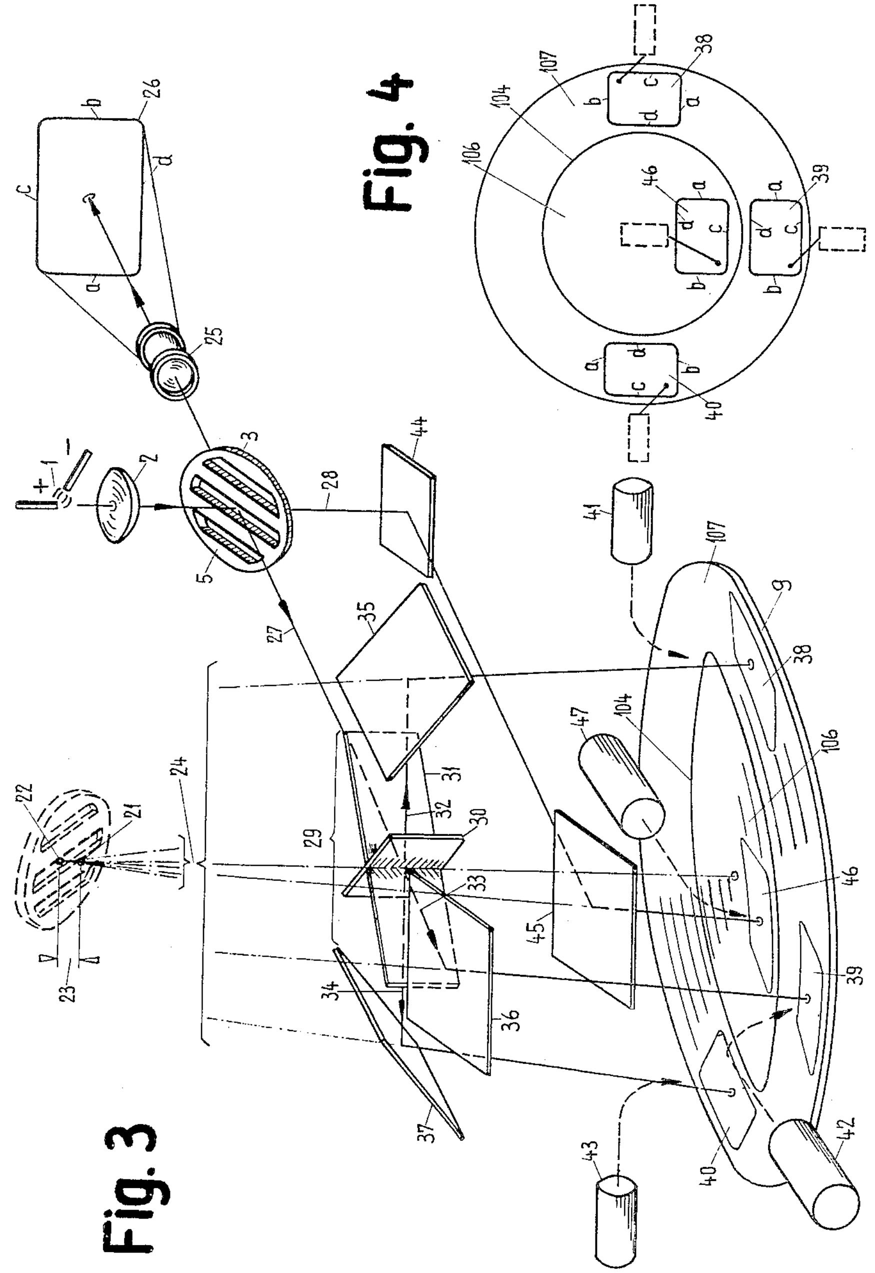
Fig. 3 is a schematic perspective representation of an embodiment according to the invention for projecting a colour television picture composed of a "black-and-white" and three colour component pictures.

Fig. 4 schematically shows the arrangement of the areas of the constituent pictures on the surface of the concave mirror of the embodiment of Fig. 3.

Figures 5, 6:
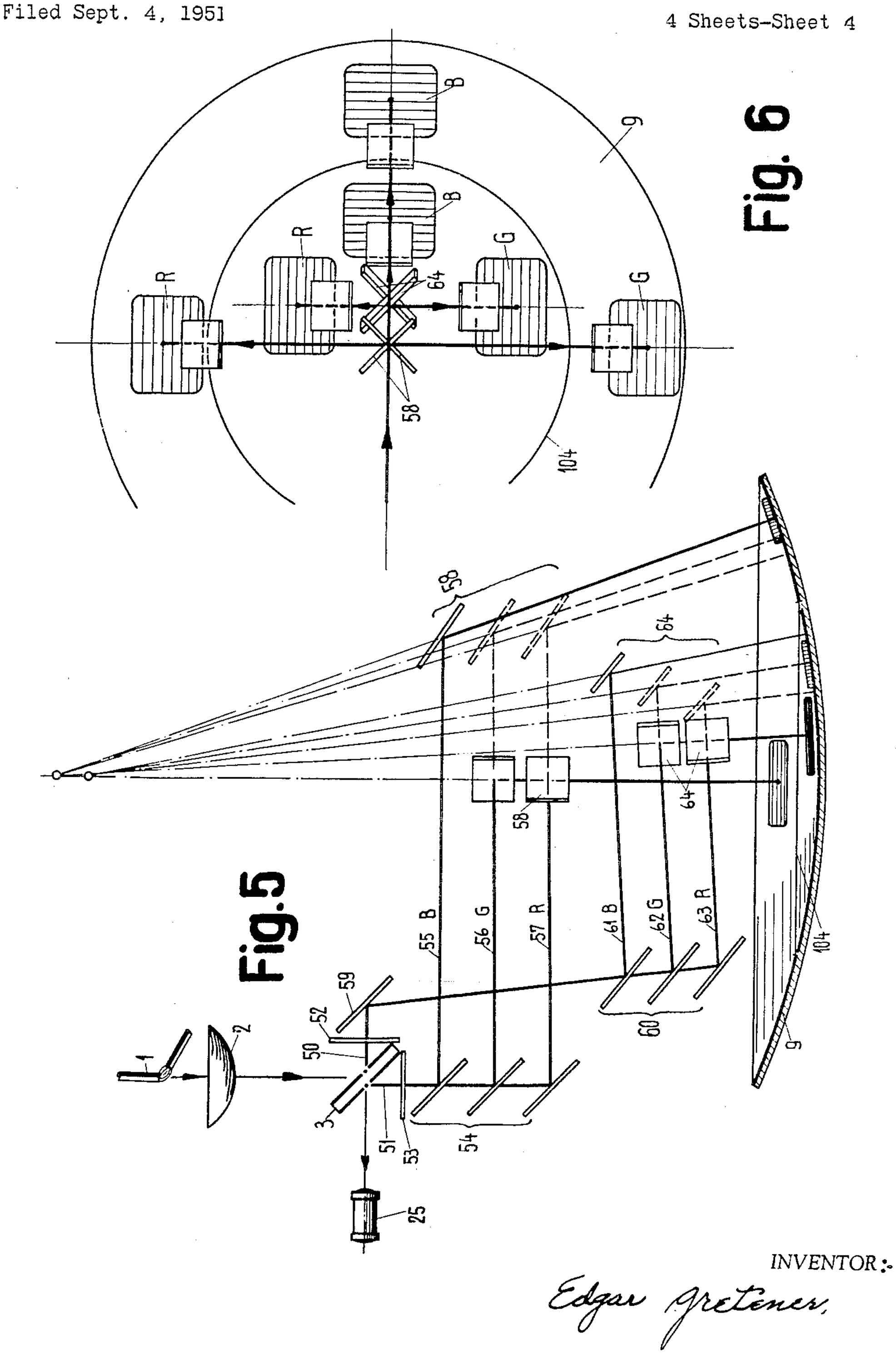

Fig. 5 is a schematic cross section through an embodiment according to the invention for the projection of stereoscopic coloured television pictures, and Fig. 6 shows the appertaining arrangement of the areas of the six constituent pictures on the surface of the concave mirror.

Figure 1:
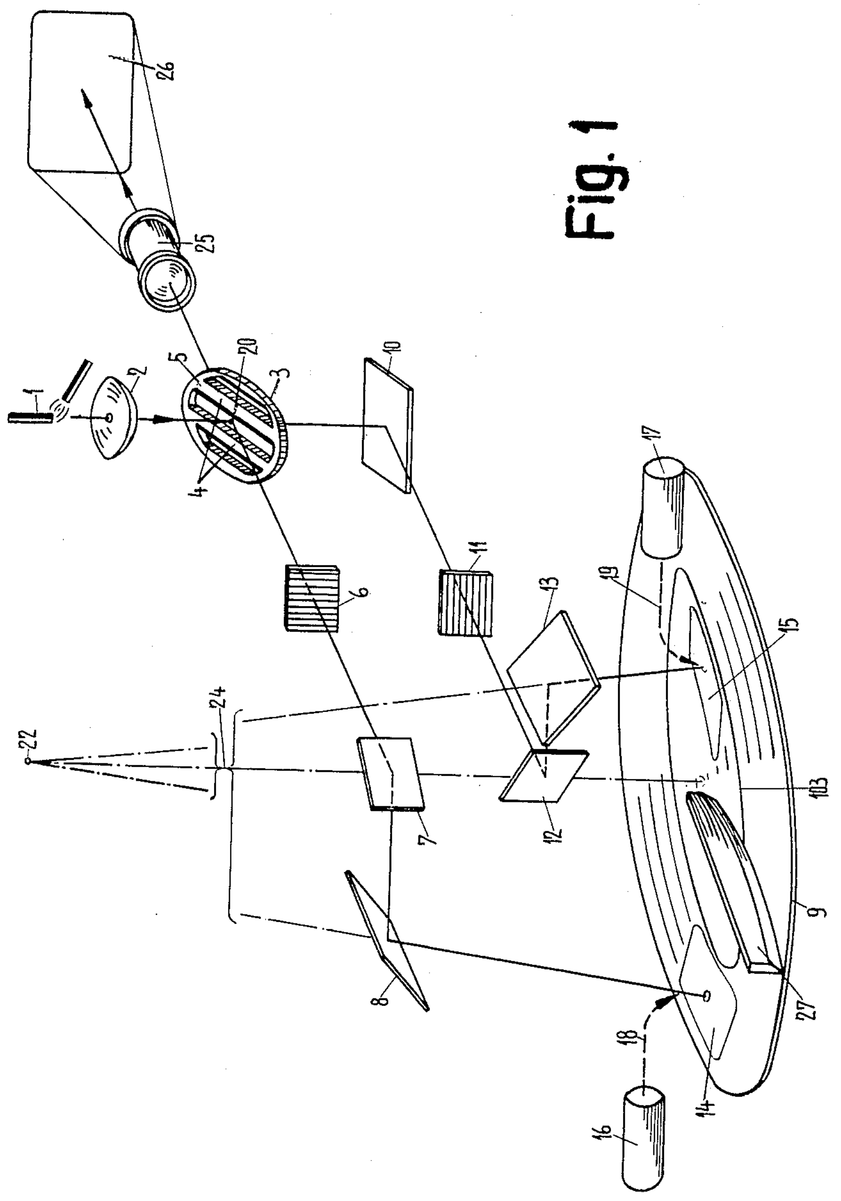
Fig. 1 is a schematic perspective representation of an embodiment according to the invention for the projection of stereoscopic television pictures.

Fig. 1 represents a schematic perspective representation of an embodiment for the projection of stereoscopic television pictures, according to the well known principle of projecting the left-eye and right-eye component pictures by means of light polarized in planes at right angles to each other. A source of light 1, for example, an arc lamp illuminates through a condenser lens 2 a bar system 3 of the Schlieren optics employed for projection. The bar system consists of bars 4 which, according to the present invention, have a reflecting surface on both sides. The light reflected in horizontal direction by the upper reflecting surface 5 of the bars impinges on a concave mirror 9 through a polarization filter 6 and two deflecting mirrors 7 and 8, whereas the light passing through the slits between the bars in a vertical direction impinges upon a deflecting mirror 10, which deflects it in a horizontal direction, then traverses a polarisation filter 11 and after deflection by the mirrors 12 and 13 it also impinges on the surface of the concave mirror 9. In order to explain beforehand in brief the basic operation of the Schlieren optics the polarization filters will be disregarded and only one of the two light beams will be followed. A thin layer of the control medium, for example, a viscous fluid or an elastic substance of high internal resistance is spread over the reflecting surface of the concave mirror 9. Electric charges varying from point to point are deposited inside a rectangular area 14 which corresponds to the contours of one of the constituent pictures to be projected. The charges are deposited by means of an electron beam 18 of a cathode-ray tube 16. The electron beam is deflected along scanning lines over the rectangular area 14 by employment of deflecting means, not shown, well known to any one skilled in the art. Therefore such devices and likewise additional devices for deflecting the electron beam through 90° are omitted. Attention must be paid to the fact that the cathode-ray tubes have been shown with their axes parallel to the surface of the concave mirror for the sole object of simplifying the drawing. A more practical arrangement in view of reduced expense would employ cathode-ray tubes with their axes at right angles to the surface of the concave mirror. The distribution of the electric charges on the rectangular area 14 must correspond to the contents of the individual pictures and is obtained, for example, by intensity or velocity modulation of the electron beam in accordance with the television signals as explained in detail in the above-mentioned Patent No. 2,391,450. By suitably depositing the charges on the control medium the surface is deformed into a set of fine raster lines. The light traversing the control layer and striking the concave mirror is effectively reflected towards the bar system. The bar system must now be so located that its center is located approximately at the focus 22 of the concave mirror 9. Due to the effect of such a mirror an image of the bar system will then be projected upon the bar system itself. As pointed out in the U. S. Patent application of Max Hetzel, Fred August Mast, Hugo Ernst and Wilhelm Thiemann, Serial No. 79,864 filed March 5, 1949, now Patent No. 2,644,938 this leads to a system of Schlieren optics in which one and the same bar system is traversed twice by the light flux, which, however, acts in the same way as the system of Schlieren optics described in the U. S. Patent No. 2,391,450.

Preferably the concave mirror is given a spherical surface and, as is well known, the desired imaging of the bar system upon itself will occur if the center of the bar system is located approximately at the center of curvature of the spherical mirror. In the following reference will be made to the employment of a spherical mirror, but all conclusion will be equally valid for any kind of concave mirror, as long as the bar system lies approximately at the focus of the concave mirror. The use of a non-spherical concave mirror may serve, for example, to correct certain inaccuracies in the image formation at such zones which are located at a certain distance from its center of curvature. In the embodiment shown by Fig. 1 the light beam between the bar system and the concave mirror is deflected by the two mirrors 7 and 8. The virtual image of the bar system is located at the center of curvature 22 of the concave mirror 9 by the effect of the mirrors 7 and 8 in such a way that the virtual image of the center of the bar system coincides with the center of curvature 22 of the concave mirror. Thereby the above condition that the center of curvature of the concave mirror must coincide with the center of the bar system is fulfilled as this condition is also satisfied if only the virtual image of one of the points coincides with the other point. To be able to illustrate this effect in spite of the considerable size of the radius of curvature of the concave mirror, the center of curvature is shown located considerably closer to the surface of the concave mirror as indicated by the interrupted rays and the brackets at 24.

As pointed out in the above mentioned patent, the light control is effected by a Schlieren optics of the kind described by the fact that the light coming from the arc lamp—after reflection on the surface of the bars—is thrown on the surface of the spherical mirror to pass the control layer and to be reflected again. If the surface of the control medium is smooth, that is when a dark field is projected, the control layer does not influence the traversing light. The reflected light impinges again upon the bar system and is thrown back to the source of light by the reflecting bar surfaces. If, however, the surface of the control layer is deformed, light in proportion to the amount of such deformation will pass through the slots between the bars and impinge upon the projection lens 25. Thus the rectangle 14 of the control layer on the spherical mirror is projected on the screen 26 by the lens.

It may be mentioned that the spherical mirror 9 is slowly rotated in order to maintain a smooth surface of the control layer. A rake 27 is provided to maintain the thickness of the control medium on the surface of the spherical mirror to its proper value. The device for rotating and the means of cooling the spherical mirror are omitted in the drawing since they are explained in detail in the above patents. Likewise is omitted the vacuum vessel enclosing the spherical mirror, cathode-ray tubes and the bar system.

The above discussion applies also to the second beam of Figure 1, which according to the invention serves to utilize the light which goes through the slots of the bar system. This beam is first deflected in a horizontal direction by mirror 10 and then thrown by the mirrors 12, 13 on the surface of the spherical mirror 9. The location and inclination of the deflecting mirror is again chosen in such a way that the image of the bar system effective for this beam coincides with the center of curvature of the spherical mirror. The light passing through the control layer and reflected from the spherical mirror will then either pass through the slots of the bar system and return to the crater or the light source 1 (dark field), or it will be deflected by the lower reflecting surface of the bar system (bright field) and strike the screen 26 through the lens 25, depending upon the deformations in the control layer of the rectangle 15 produced by the electron beam 19 of the cathode-ray tube 17.

The center of the bar system, whose virtual image is to coincide with the center of curvature of the spherical mirror of such a twice-used bar system naturally lies once on the upper surface and once on the lower surface of the bar system. For the constituent beam deflected horizontally in Fig. 1 from the upper bar surfaces the center which is to coincide with its own image lies in the plane of the upper surface of the bar system whereas for the beam passing through the bar system, which after reflection from the spherical mirror is deflected towards the projection lens by the lower surface of the bar system, it lies in the plane of the likewise reflecting lower surface of the bars. This fact sets certain requirements as to the design of bar system and concave mirror which will be discussed below.

Since, as already mentioned, the deformation of the surface permits the storage of the received picture for the duration of approximately the entire picture period, it is in principle also possible to scan the two constituent pictures in succession by a single cathode-ray tube, while the scanned pictures are projected continually and simultaneously. In this way it is possible to use a single transmission channel and a single receiver system for the individual pictures without sacrificing the advantages of a simultaneous and continuous projection of the individual pictures.

It is possible by means of the arrangement shown in Fig. 1 to use a single system of Schlieren optics to project several pictures simultaneously, and at the same time eliminate the light losses in the bar system of the previously known systems. The arrangement shown in Fig. 1 may, for example, serve to project stereoscopic television pictures. For this purpose the two rectangles 14 and 15 are scanned in accordance to two pictures corresponding to the right-eye and left-eye picture. Two polarization filters 6 and 11 are inserted in the paths of the rays of the two component pictures which polarize the passing light in a vertical and a horizontal direction, respectively. The screen 26 must reflect metallically in order not to neutralize the polarization of the two partial pictures projected in superimposition and is observed through glasses, one of which polarizes vertically and the other one horizontally. The right eye will see only the right-eye picture and the left eye only the left-eye picture, thus obtaining the desired stereo-effect. In order that the two polarized pictures may be superimposed properly on the screen 26, their boundaries may be superimposed properly on the screen 26, their boundaries must coincide in registration.

The desired cooperation of bar systems and spherical mirror at the Schlieren optic will be ensured for both constituent picture areas as long as the above-mentioned condition is fulfilled, i. e. as long as the virtual image of the center of the bar system is seen from each constituent picture area to coincide with the center of curvature of the spherical mirror. This may be obtained as explained above by suitably adjusting the position and inclination of the deflection mirrors 7 and 8, or 10, 12, 13.

To enable both pictures to be projected on the screen in registration by a single lens, the optically effectve distance between the areas of the component pictures on the concave mirror and the lens must be equal for all components. Furthermore the picture areas as seen from the projection lens must be of identical size and must not be rotated one with respect to the other to insure exact superposition of the pictures on the screen. The latter conditions may be readily satisfied by proper design and mounting of the cathode-ray tubes. The size of the pictures may be adjusted by proper choice of the deflecting voltages and the position of the pictures obtained by proper choice of the direction of the scanning by the electron beam.

On the other hand, the condition of equal optical distance between the projection lens and the areas on the surface of the spherical mirror for all the constituent rays is not so easily satisfied. Its fulfilment meets with difficulties insofar as the optical length of the constituent rays between the individual picture area and the corresponding center of the bar system must also be identical if the Schlieren optics is to function properly. It follows from both conditions that when a spherical mirror is used with a uniform radius of curvature, the distance between the upper and lower sides of the bars, that is, the thickness of the bars in the bar system must be zero. This could be achieved in principle by cementing thin strips, reflecting on both sides, between two supporting plane-parallel glass plates. The supporting glass plates, however, impair the operation of the Schlieren optics, and it becomes necessary to employ bars of finite thickness. To insure sufficient rigidity and cooling in order to dissipate the heat energy absorbed from the light flux, the bars must be at least from a few millimeters to several centimeters thick. In order to satisfy the condition of the Schlieren optics as well as the condition of superposition, a spherical mirror is used according to the invention which is made up of two portions of different radii. The two partial beams are projected upon different portions of the mirror, the difference between the two radii of curvature being equal to the optically effective distance between the upper and lower reflecting surfaces of the bars.

Figure 2:
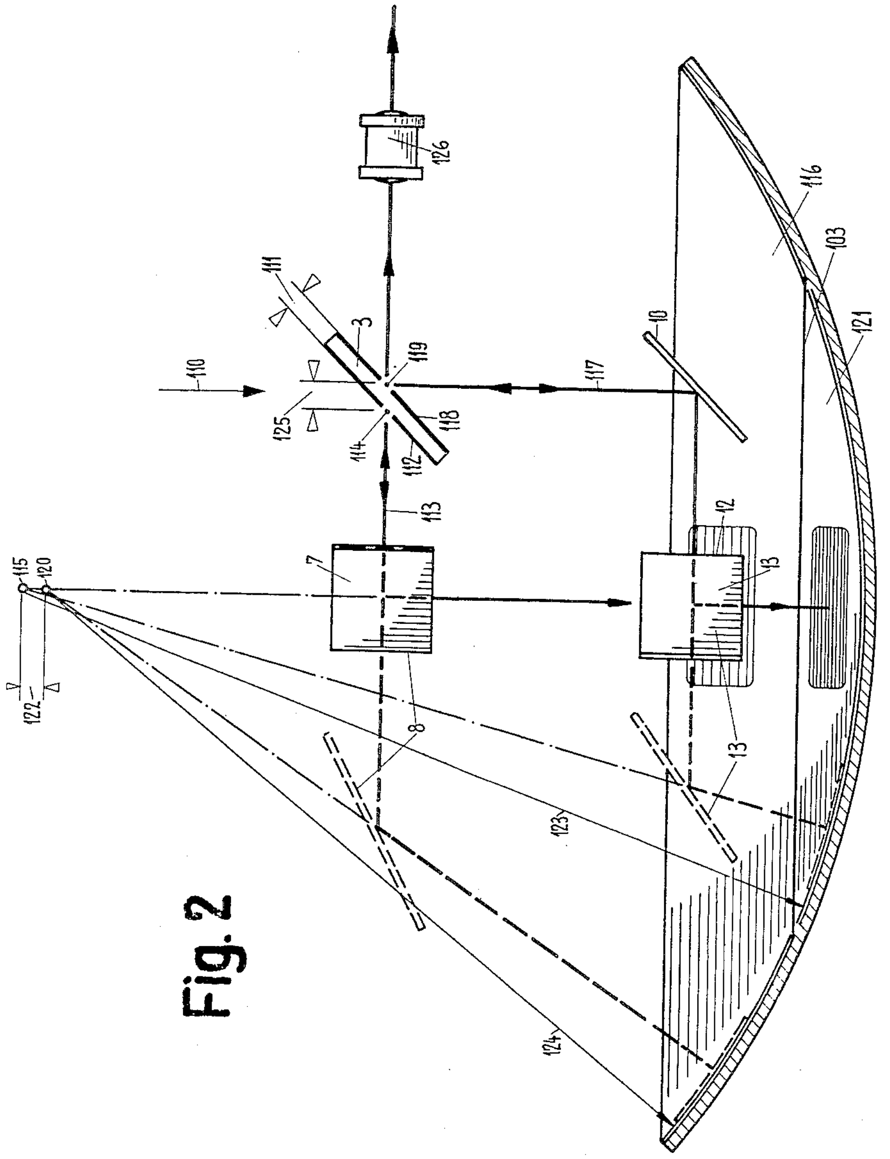
Fig. 2 is a schematic cross section through the same arrangement.

This is explained in Fig. 2 which schematically shows a cross section through such a composite spherical mirror, the notation of identical parts being the same as before. The light beam 110 strikes the bar system 3 having a thickness 111. For the ray 113 reflected from the reflecting upper surface 112, the center 114 of the upper surface of the bar system must have its virtual image located approximately at the center of curvature 120 of the corresponding portion 116 of the spherical mirror. To explain this the path of the rays is made to lie in the plane of the drawing as indicated by dashes. For the light beam passing through the slits of the bar system, for which the lower reflecting surface of the bar system 118 is effective, the center 119 of the lower surface of the bar system must have its virtual image approximately located at the center of curvature 115 of the portion 121 or the spherical mirror. The path of the rays is again shown to coincide with the plane of the drawing. The difference 122 between the radii of curvature 123 and 124 of the spherical mirror portions 121 and 116 is equal to the optically effective distance 125 between the upper and the lower reflecting surfaces of the bar system. The optical length of the beam 117 between the center 119 of the lower surface of the bar system 3 and the surface of the picture on the portion 121 of the spherical mirror is now equal to the optical length of the beam 113 between the center 114 of the upper surface of the bar system and the picture area on the portion of the spherical mirror 116 plus the distance 125 between the upper and the lower sides of the bar system. As seen from the lens 126, the optical length between this lens and the two component picture areas to be projected is identical. At the same time the condition of the Schlieren optics is satisfied for both beams. Hence, the concave mirror consists no longer of a spherical cap of the same radius but of a spherical cap 121 of radius 123 and an annular zone 116 cut out of a spherical surface of radius 124. This subdivision of the surface of the concave mirror is also indicated in Fig. 1 by the dviding line 103 between the two surface portions.

In addition to the advantage of a full utilization, in principle, of the light from the light source, the invention has the advantage that the deflection of the rays between the bar system and the concave mirror permits a very compact design of the bar system and concave mirror and thus a reduction in the size of the vacuum vessel enclosing, as already mentioned, the concave mirror cathode-ray tubes, and bar system.

Such a system, which utilizes the light passing through the bar system as well as the light reflected from it, may naturally be used also for other purposes where the projection of several constituent pictures is required, for example, in colour television. This is shown in Fig. 3, where the colour picture is constituted by four components, three corresponding to the three component colours, and one to an additional black and white component which, for example, reproduces the distribution of brightness Such methods for colour television, which in addition to the three colour components, transmit a fourth component, for example, a picture corresponding to the distribution of brightness have already become known (see U. S. Patent No. 2,423,769 Goldsmith). The use of a fourth component picture permits the correction of certain irregularities in the reproduction of colour. Such colour irregularities are due, for example, to the unavoidable deviations from the ideal characteristics of the taking colour filters used or to the deviations of the light sensitivity of the photocells or the transmission properties of the transmission channels from their theoretically required behaviour. Beyond that the use of a black and white picture has the advantage that the outlines or the contrast of the picture may be made to depend mainly on this black and white picture which considerably reduces the requirements of accuracy or the frequency band of the remaining colour channels without ensuing reduction in quality to the same degree. The black-and-white picture may be produced by a separate apparatus, and this apparatus may employ, as known from colour photography, for example, an infrared and ultraviolet or orthochromatic filter so as to utilize the parts of the light spectrum which are especially effective in reproducing the contrasts, the brightness distribution or the outlines of the picture. The black-and-white picture may, naturally, be obtained in any other way. At the same time the black-and-white picture and the colour pictures may be employed to mutually correct each other to raise the fidelity and quality of the pictures. In any case, however, all these pictures have to be made to coincide in registration at the receiver.

An apparatus using this method for the transmission of colour television is shown in Fig. 3, the same notation as in Fig. 1 being used for identical parts. The light beam from lamp 1 again strikes the bar system 3 over a condenser lens 2, whereas the light beam leaving the bar system is thrown on the screen 26 through the projection lens 25. The incident light is again split into two beams 27 and 28, but the beam 27 now serves for the illumination of the three constituent colour pictures, while the beam 28 serves to illuminate the black-and-white picture. Beam 27 strikes a colour splitter 29 consisting of two colour selective dichroic light filters 30 and 31. This splitter splits the white light in three colours, for example, a blue beam 32, a green beam 33 and a red beam 34. To achieve this the two light filters (interference mirrors) must be so designed that mirror 30 will pass the red and green portion of the white light and reflect blue, while mirror 31 will reflect red and pass green and blue. A different arrangement of the mirror as regards the reflected and passed spectral ranges may, naturally, also be devised. Such colour selective dichroic light filters are not new. For example, one or several layers having different refraction indices are superimposed by evaporation on a transparent support, the layer thickness having a certain relation to the wave length of the light spectrum to be passed or reflected. Such light filters have the advantage over the earlier absorption filters of splitting practically without losses the white light from the source into the different coloured components. As compared to this an absorption filter only passes a certain spectral range, while the remainder of the spectrum of the incident white light is absorbed inside the filter which results in a loss of light and produces heating of the filter.

The three partial light beams leaving the light splitter strike three mirrors 35, 36, 37 and are deflected towards the concave mirror 9 in such a way as to illuminate the rectangles 38, 39 and 40 with the respective colours, for example, blue, green and red. It is not necessary to confine the illumination strictly to these rectangles since the light reflected from the remaining parts of the spherical surface is thrown back by the Schlieren optics to the crater of the source of light. It is possible, however, by inserting rectangular masks in the path of the light to limit the illumination of the spherical surface to the rectangles. In the arrangement shown each of the three constituent colour surfaces is assigned a separate cathode ray tube 41, 42, 43, the modulation of the electron beams producing the surface deformations. After reflection from the concave mirror 9, the coloured beams again pass through the colour splitter, but in the opposite direction, strike the bar system 3, and are either reflected back to the light source (dark picture points) or thrown on the screen 26 (bright picture points) through the projection lens 25, depending upon the deformation of the individual points of the respective rectangles. In order to satisfy the already-mentioned condition for the proper functioning of the Schlieren optics, the constituent beams must be so deflected by the mirrors 35, 36, 37 that as seen from the individual rectangles, the virtual image of the center of the bar system approximately coincides with the corresponding center of curvature 21 of the concave mirror 107. This may be accomplished by suitable mutual position and inclination of the mirrors 35, 36, 38 and the color selective mirrors 30, 31.

The light beam 28 serving to illuminate the black-and-white picture is directed to the rectangle 46 on the spherical mirror 9 by the mirrors 44 and 45. The Schlieren optical condition requires that the mirrors 44 and 45 be so arranged that when observed from the rectangle 46 the virtual image of the center of the bar system will coincide with the center of curvature 22 of the concave mirror 106.

Insofar as the partial beams are already of the same optical length between the pictures on the spherical mirror and the projection lens in order to satisfy the above condition—and this is the case in Fig. 3 for the three paths of light of the colour pictures—the pictures will exactly coincide on the screen when they are scanned by the cathode-ray tubes on the spherical mirror in rectangles of identical size. This has the advantage that cathode-ray tubes may be of identical design. But as a result of the finite thickness of the bars, i. e. the finite distance between the surfaces of the upper and lower sides of the bars, this path length is not the same for the two branches of the Schlieren optics. If the condition of equal optical length of beam is to be satisfied, a composite mirror, consisting of two portions of spherical shape, must again be used, the difference between the radii of curvature 23 being equal to the optically effective distance between the upper part 5 and the lower part of the bars. Picture areas belonging to the same branches of the Schlieren optics must lie on the respective portion of the spherical mirror indicated in Fig. 3 by the dividing line 104. Thus, the rectangle 46 of the black and white picture lies on the inside part 106 of the spherical mirror, and the rectangles 38, 39 and 40 of the three colour pictures lie on the outside zone 107 of the spherical mirror. The size and position of these rectangles must be so determined by the proper arrangement of the cathode-ray tubes, the deflections of the electron beams and the direction of the scanning lines that when seen from the projection objective 25 all the constituent pictures will exactly coincide in registration.

But owing to the iterated deflection of the individual beams by the deflection mirrors or dichroic light filters, the direction of scanning of the electron beams must be different for the individual pictures if the four constituent pictures are to coincide in correct orientation. This is shown in Fig. 4, which represents the relative position of the sides of the rectangular areas with respect to the appertaining sides of the screen, where the related sides are denoted by the same letters *a, b, c, d*. If the cathode-ray tubes are mounted as in Fig. 3, the lines in the red and blue picture areas 40 and 38 are scanned in one direction and the lines in the green picture area 39 must be scanned in the opposite direction, while in the black and white picture area 46 the upper and the lower edges, as seen from tube 47, are interchanged with respect to the several color picture areas.

Such a device for projecting colour television pictures permits the use of one and the same Schlieren optics consisting of a single bar system and a single concave mirror for the simultaneous projection of the constituent colour pictures. The deflection of the rays between the bar system and the concave mirror permits a very compact design of the bar system and concave mirror while maintaining the same optical distance between the two, which results in a reduction in size of the vacuum vessel containig the concave mirror, the cathode-ray tubes and the bar system.

The colour splitter 29 may be made up of four rectangular prisms instead of two intersecting reflecting surfaces thus eliminating the blank zone where the reflecting surfaces intersect. The four prisms may be either cemented together or held in a common adjustable frame, thus forming two intersecting selectively reflecting surfaces.

The intersecting mirrors may also be replaced by a colour splitter consisting of parallel colour selective dichroic mirrors whose planes do not intersect inside the path of the light. Also, the functions of the deflection mirrors and the interference mirrors may be combined. Arrangements of this kind are described in my co-pending application Serial No. 245,023, filed Sept. 4, 1951, the advantages and disadvantages of such a device being described in detail in that application. The Schlieren optics, however, will always function properly as long as the mirrors between the bar system and the spherical mirror deflect the partial beams in such a way that, as seen from each component picture area on the concave mirror, the virtual image of the center of the bar system acting for this picture approximately coincides with the center of curvature of the corresponding part of the concave mirror.

It is, naturally, also conceivable to use such an arrangement for the projection of coloured stereoscopic television pictures where a right eye and left eye picture is composed each of three colour components, which are projected on the screen. The light beams corresponding to the right and lefteye pictures are polarized in two mutually perpendicular planes, so that when observed through glasses with polarized pictures the right eye will see only the righteye picture composed of the three colour components and the left eye will see only the lefteye picture composed in a similar way. Such an arrangement is schematically shown in cross section in Fig. 5, which is self-explanatory. The light from the light source 1 is again split into two beams 50 and 51 by the bar system. These two beams pass through polarization filters 52 and 53 where the two stereocomponents are polarized, as in Fig. 1, in two mutually perpendicular planes. The vertical beam 51 enters a colour splitter 54 consisting of parallel diochroic mirrors, whereby it is split, for example, into a blue, green and red ray 55, 56 and 57. These rays are then directed towards the spherical mirror by mirrors 58 while complying with the Schlieren optics condition. The beam 50 leaving the bar system is deflected downwards by a mirror 59 and strikes a colour splitter 60 which splits it into three rays, for example, blue, green and red, 61, 62 and 63, which are then again deflected towards the surface of the spherical mirror by mirrors 64. While maintaining the Schlieren optics condition that for each beam the virtual image of the corresponding center of the bar system must coincide with the center of the spherical mirror, the beams now illuminate the corresponding rectangles on the surface of the spherical mirror which are scanned by cathode-ray tubes not shown in the drawing. In order to balance the effect of the finite thickness of the bar system, the pictures again lie on two portions of spherical surfaces of different radii of curvature indicated by the dividing line 104. The position of the constituent picture areas on the spherical mirror is shown schematically in Fig. 6.

The colour splitters may consist of intersecting mirrors as well as of a set of parallel mirrors, and may, naturally, also be used in the arrangement of Fig. 5 instead of the parallel mirrors. It is merely necessary in each case to so arrange the position and inclination of the interference mirrors and deflecting mirrors that the Schlieren optics condition will be satisfied for all the beams, and that the rectangular areas projected on the screen through the Schlieren optics will be so arranged on the surface of the spherical mirror that the picture will coincide in registration with sufficient accuracy on the screen. This superposition condition must be fulfilled with very high accuracy for the colour components in order to avoid coloured edges, whereas this condition is not so sharp for the right- and lefteye pictures in stereoprojection although it must still lie below a certain limit to prevent eye fatigue.

For the sake of clarity only such embodiments have been described above wherein the control layer and the component pictures are located on one common concave mirror. The invention, however, also comprises the more general case wherein one separate concave mirror is employed for each of the component pictures, all such separate concave mirrors co-operating with one common mirror bar system. The same conditions, i. e. the "Schlieren-optics" and the "registration" condition, must again be fulfilled by suitable relative position of mirror bar system, concave mirrors and the additional optical means, as may be required. If these requirements are met with an arrangement of several concave mirrors the apparatus will act in the same way as an arrangement with one common mirror. An arrangement of that kind has been described in detail in my co-pending application Serial No. 245,023, filed Sept. 4, 1951 and the present invention may analogously be employed with such an arrangement.

Reference has been made in the foregoing to the employment of the described apparatus for the projection of television pictures, and it is to be understood that the term "television picture" is employed in a broad sense to identify any kind of picture synthesized by trains of electrical signals which are obtained by scanning an original picture or a scene along contiguous lines.

I claim:

1. In an apparatus for the simultaneous projection of the several component pictures of a composite television picture to a projection screen, a mirror bar system comprising a plurality of spaced bars and having reflecting surfaces on both sides of the bars thereof, a source of white light, and means for projecting light from said source to said mirror bar system whereby a first component of said light is reflected from that side of the bar system which the projected light strikes while a second component of said light passes through the spaces between said bars, concave mirror means having thereon a control layer and having a picture area on said layer for each component picture, a projection lens, cathode ray means individual to and scanning said picture areas respectively to impart thereto point-to-point variations in said control layer in correspondence with the appertaining picture signals in each cathode ray means, first optical means located between said mirror bar system and said concave mirror means for deflecting to a first one of said picture areas said first component of light subsequent to reflection from said bar system, second optical means located between said mirror bar system and said concave mirror means for deflecting to a second one of said picture areas said second component of light subsequent to passage through the spaces between the bars of said bar system, said first and second optical means developing a virtual image of said mirror bar system with its center substantially coinciding with the center of curvature of the associated picture area and superposing said picture areas in register as viewed from said projection lens, whereby said first component of light incident upon that part of said control layer constituting said first picture area at points contacted by one of said cathode ray means will be directed back through the spaces between the bars of said mirror bar system to said projection lens, and whereby said second component of light incident upon that part of said control layer constituting said second picture area at points contacted by the other of said cathode ray means will be directed back to the opposite side of the bars of said mirror bar system and reflected therefrom to said projection lens.

2. An apparatus as defined in claim 1 wherein the reflecting surfaces on both sides of said mirror bar system are disposed in parallel planes at right angles to a plane passing through the optical axes of said projection lens and said concave mirror means.

3. An apparatus as defined in claim 1 wherein said concave mirror means is composed of two portions of spherical mirrors corresponding to said picture areas and having different radii of curvature, and wherein the difference of said radii equals the optically effective distance between said reflecting surfaces at opposite sides of said mirror bar system.

4. An apparatus as defined in claim 3 serving for the simultaneous projection of a black-and-white component and a plurality of colour component pictures composing a colour television picture, wherein one of said picture areas corresponding to the black-and-white component picture is located on one of said spherical mirror portions and the other of said picture areas corresponding to the colour component pictures are located on the other of said spherical mirror portions, and wherein a colour splitter comprising at least two dichroic light filters is located in the path of one component of said white light between one side of said mirror bar system and said other spherical mirror portion to split up said light component into at least three beams of different colour which each impinge upon the appertaining colour picture area of said other spherical mirror portion.

5. An apparatus as defined in claim 3 serving for the simultaneous projection of two partial pictures comprising a stereoscopic television picture, wherein the area corresponding to the right-eye picture is located on one of said spherical mirror portions and the area corresponding to the left-eye picture is located on the other of said spherical mirror portions, and which further includes a first polarisation filter interposed in the path of said first light component between one side of said mirror bar system and one of said picture areas and a second polarisation filter interposed in the path of said second light component between the other side of said mirror bar system and the other of said picture areas, said filters polarizing said first and second light components in two mutually perpendicular planes and thereby also establishing two superimposed images upon the projection screen polarized in two mutually perpendicular planes.

6. An apparatus as defined in claim 3 serving for the simultaneous projection of the partial images composing a stereoscopic coloured television picture, wherein the areas corresponding to the colour components of the right eye picture are located on one of said spherical mirror portions and the areas corresponding to the colour components of the left-eye picture are located on the other of said spherical mirror portions, and which further includes a first colour splitter comprising at least two dichroic light filters disposed in the path of said first light component between one side of said mirror bar system and one of said spherical mirror portions, a first polarisation filter interposed in the path of said first light component between one side of said mirror bar system and said first colour splitter, a second colour splitter comprising at least two dichroic light filters disposed in the path of said second light component between the other side of said mirror bar system and the other of said spherical mirror portions, and a second polarisation filter interposed in the path of said second light component between the other side of said mirror bar system and said second colour splitter, said filters polarizing said first and second light components in two mutually perpendicular planes and thereby also establishing two superimposed colour images upon the projection screen polarized in two mutually perpendicular planes.

References Cited in the file of this patent

UNITED STATES PATENTS

| | | |
|---|---|---|
| 2,330,172 | Rosenthal | Sept. 21, 1943 |
| 2,423,769 | Goldsmith | July 8, 1947 |
| 2,465,652 | Legler | Mar. 29, 1949 |
| 2,549,585 | Epstein | Apr. 17, 1951 |
| 2,568,543 | Goldsmith | Sept. 18, 1951 |
| 2,577,756 | Harrington | Dec. 11, 1951 |
| 2,589,930 | Dimmick et al. | Mar. 18, 1952 |
| 2,600,590 | Thomas | June 17, 1952 |

FOREIGN PATENTS

| | | |
|---|---|---|
| 268,713 | Switzerland | May 31, 1950 |